(12) United States Patent
Shimada et al.

(10) Patent No.: US 6,654,680 B2
(45) Date of Patent: Nov. 25, 2003

(54) CPU DIAGNOSING DEVICE AND METHOD

(75) Inventors: Kousaku Shimada, Hitachinaka (JP);
Takashi Okamoto, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 297 days.

(21) Appl. No.: 09/887,010

(22) Filed: Jun. 25, 2001

(65) Prior Publication Data

US 2002/0032516 A1 Mar. 14, 2002

(30) Foreign Application Priority Data

Sep. 5, 2000 (JP) ........................ 2000-269178

(51) Int. Cl.[7] ............................. G06F 7/00; F02D 45/00
(52) U.S. Cl. ..................... 701/114; 701/115; 701/29; 701/35
(58) Field of Search ................... 701/114, 110, 701/102, 29, 33, 35, 115

(56) References Cited

U.S. PATENT DOCUMENTS

| 5,070,258 A | * 12/1991 | Izumi et al. ............... 327/565 |
| 5,184,594 A | * 2/1993 | Saitoh et al. ............. 123/406.13 |
| 5,880,568 A | 3/1999 | Bederna et al. |
| 6,006,146 A | * 12/1999 | Usui et al. ..................... 701/29 |
| 6,125,322 A | 9/2000 | Bischof et al. |
| 6,502,021 B2 | * 12/2002 | Wada et al. ................. 701/31 |
| 2001/0029424 A1 | * 10/2001 | Iwamoto et al. ............ 701/114 |

FOREIGN PATENT DOCUMENTS

| EP | 1 001 257 A1 | * 5/2000 | ........ G01M/17/007 |
| JP | 10-177499 A | * 6/1998 | ........... G06F/11/22 |

OTHER PUBLICATIONS

Patent Abstract of Japan; Publication No. 2000–029734; Publication Date, Jan. 28, 2000; Sato Yoshinori; CPU Abnormality Monitoring System; Nissan Motor Co. Ltd.

* cited by examiner

*Primary Examiner*—Hieu T. Vo
(74) *Attorney, Agent, or Firm*—Dickstein Shapiro Morin & Oshinsky LLP

(57) ABSTRACT

The invention provides a CPU diagnosing device and method comprising an arithmetic processing section provided with a plurality of processing states, a exercise setting section for setting exercises and a exercise processing section which is programmed to match the plurality of processing states wherein the exercise processing section provides solutions to the exercises for diagnosing the CPU based on the matched processing states.

45 Claims, 14 Drawing Sheets

CPU DIAGNOSING DEVICE AND METHOD

FIELD OF THE INVENTION

The present invention relates to a CPU diagnosing device and method, more particularly, to a CPU diagnosing device and method for automotive control units.

DISCUSSION OF THE RELATED ART

Automotive control units typically have a CPU diagnosing device which monitors and provides corrected operation for a CPU for such control units which, if abnormal, may adversely affect the driving performance of the automobile.

Conventional CPU diagnosing devices, such as those disclosed in the Japanese Translation of Unexamined PCT Application No. Hei 10-507805 and the Japanese Published Unexamined Patent Application No. 2000-29734 are known. In each of the CPU diagnosing devices disclosed in these published applications, there are at least two channels provided in the CPU which prevent them from functionally affecting each other except when a error is found. The two levels include, a functional level (actual control arithmetic processing level) and a monitoring level (an arithmetic processing level for diagnosis), which makes it possible to achieve with a single computing element the reliability and availability of operation comparable to two computing elements. Often, a third level for checking the operation at a second level is provided. For instance, an "active watchdog" can be used which executes operations in a question-and-answer format.

However, in the CPU diagnosing devices referred to above, an exercise is given to the CPU, and it operates on that exercise independent of the arithmetic processing for actual control and returns the results of the operation (solution) to the exercise source, so that the CPU can be diagnosed on the basis of that solution whether or not the CPU is normal. But, these methods provide unsatisfactory and inaccurate results due to the independent operation of the exercise apart from actual control.

For instance, in an engine control device, there are three combustion modes of the engine including the stoichiometric mode, the homogeneous lean mode and the stratified lean mode. The function to determine the output to each actuator at the first level and the function to estimate, for instance the output level, at the second level differ from mode to mode. But, no particular consideration is given in any conventional CPU diagnosing device to this factor.

Thus, the conventional CPU diagnosing device can only take one arithmetic processing state out of a plurality of arithmetic processing states for different combustion modes including for instance the stoichiometric mode, the homogeneous lean mode and the stratified lean mode and cannot perform effective arithmetic processing according to the current selected arithmetic processing state.

SUMMARY OF THE INVENTION

The present provides a CPU diagnosing device and method for varying the monitoring (diagnosing) mode according to the arithmetic processing state of the CPU and diagnosing whether or not normal arithmetic processing is being carried out in the current arithmetic processing state.

In an object of the present invention, a CPU diagnosing device is capable of taking one arithmetic processing state selected from a plurality of arithmetic processing states and performs effective arithmetic processing according to the selected arithmetic processing state. The CPU diagnosing device is provided with an exercise setting section for setting exercises and exercise arithmetic processing sections, one or another of which is disposed to match each of the plurality of arithmetic processing states, for calculating exercises set by the exercise setting section. The CPU is determined to be normal or not on the basis of the solutions to the exercises calculated by the exercise arithmetic processing sections. In this way, it is possible to vary the mode of monitoring (diagnosis) with the arithmetic processing state of the CPU and to diagnose whether or not arithmetic processing is normally carried out in the current arithmetic processing state.

In another embodiment of the invention, the CPU performs arithmetic processing by a function differing with the arithmetic processing state, and the exercise arithmetic processing sections select, out of a plurality of functions, a function matching the state which the CPU can currently take and thereby performs exercise calculation.

In a object of the present invention, the exercise setting section is provided outside the CPU, transmits an exercise to the CPU and receives a solution from the exercise arithmetic processing section by the CPU.

In another object of the invention, exercise arithmetic processing sections corresponding to different arithmetic processing states are cyclically selected in succession, and the selected exercise arithmetic processing section calculates an exercise from the exercise setting section.

Further, in another object of the invention, the exercise arithmetic processing sections have a plurality of types of exercise arithmetic processing sections each, and an exercise from the exercise setting section is calculated by the selected exercise arithmetic processing section.

In yet another embodiment of the present invention, an exercise arithmetic processing section using a random number in executing exercise calculation can be selected. In this case, as the random number, the value of some or every digit of a timer or counter of the CPU after the lapse of a prescribed length of time can be used.

In an object of the present invention, a CPU to be diagnosed can be a CPU for engine control use. In this case, the plurality of arithmetic processing state of the CPU are set corresponding to a plurality of combustion modes that the engine can take and the combustion modes can include a stoichiometric mode and lean modes or be three modes including the stoichiometric mode, a homogeneous lean mode and a stratified lean mode.

In yet another embodiment of the present invention, in the event that the CPU is diagnosed not to be normal, the present invention issues a command to prohibit operation in the combustion mode in which it has been diagnosed not to be normal and operates the engine in some other combustion mode.

In yet another embodiment of the present invention, a CPU to be diagnosed is a CPU for a control device for controlling the torque and speed of wheels, and performing calculation on exercises using the wheel speed, acceleration, drive torque or brake torque or a combination of this plurality of parameters.

BRIEF DESCRIPTION OF THE DRAWINGS

The above advantages and features of the invention will be more clearly understood from the following detailed description which is provided in connection with the accompanying drawings.

DETAILED DESCRIPTION OF THE INVENTION

Figure 1:
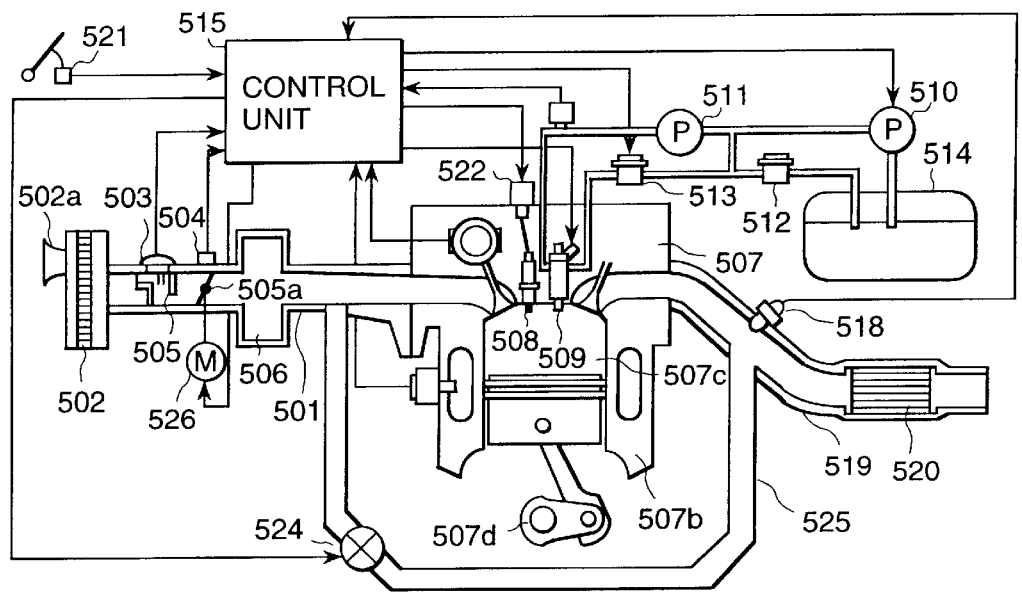
FIG. 1 is a diagram of an in-cylinder injection engine utilizing a CPU diagnosing device of the present invention.

Exemplary embodiment of the present invention will be described below in connection with the drawings. Other embodiments may be utilized and structural or logical changes may be made without departing from the spirit or scope of the present invention. Although the invention is described in terms of an automobile component, namely, an automobile control unit, the invention is equally applicable to other control units. Like items are referred to by like reference numerals throughout the drawings.

FIG. 1 illustrates a control system for an in-cylinder injection engine 507. Air (flow quantity Qc) introduced into a combustion chamber 507c of the engine 507 is a combination of an air intake (flow quantity Qa) and EGR gas (flow quantity Qe), wherein the air intake is let in by way of an inlet part 502a of an air cleaner 502 and passes through an air flowmeter (air flow sensor) 503, which is one of the means for measuring the operating state of the engine 507. The air further passes through a throttle body 505 in which an electrically controlled throttle valve 505a for controlling the air intake flow quantity is housed. The electrically controlled throttle valve 505a is driven by an electrically controlled throttle motor 526. Next, the air and enters a collector 506. From the air flow sensor 503, a signal representing the air intake flow quantity Qa is outputted to a control unit 515, for example, an engine control device.

To the throttle body 505, a throttle sensor 504, which detects the aperture of the electrically controlled throttle valve for measuring the operating state of the engine, is fitted, and its signal is also outputted to the control unit 515.

Between an air intake pipe 501 and an exhaust pipe 519, a bypass pipe 525 is provided to constitute bypass piping for recirculating exhaust gas and the bypass pipe 525 is provided with an electrically controlled type EGR valve 524, for controlling the recirculating flow quantity of exhaust gas.

The air (pressure Pm) suctioned into the collector 506, after being distributed to air intake pipes 501, each connected to one or another of cylinders 507b of the engine 507, joins EGR gas and is guided to a combustion chamber 507c in each cylinder 507b.

Fuel, such as gasoline, from a fuel tank 514 undergoes primary pressurization by a fuel pump 510, then undergoes secondary pressurization by another fuel pump 511 to a higher pressure while being regulated by a fuel pressure regulator 512 to a constant pressure (primary normal pressure). The fuel is subjected to another constant pressure (secondary normal pressure) by another fuel pressure regulator 513 and directly injected from injectors 509, one of which is provided for in each cylinder, into combustion chambers 507c. Fuel injected into combustion chambers 507c is raised in voltage by ignition coils 522 and ignited by ignition plugs 508 in response to an ignition signal.

A crank angle sensor 516 (see FIG. 2) fitted to a crankshaft 507d of the engine 507 outputs an angle signal POS for detecting a revolution signal (number of revolutions), indicating the rotational position of the crankshaft 507d, to the control unit 515.

A catalytic converter 520 is provided midway on each exhaust pipe 519, and an A/F sensor 518 provided upstream from the catalytic converter 520 detects the contents of exhausted gas, the resultant detection signal being outputted to the control unit 515.

Figure 2:
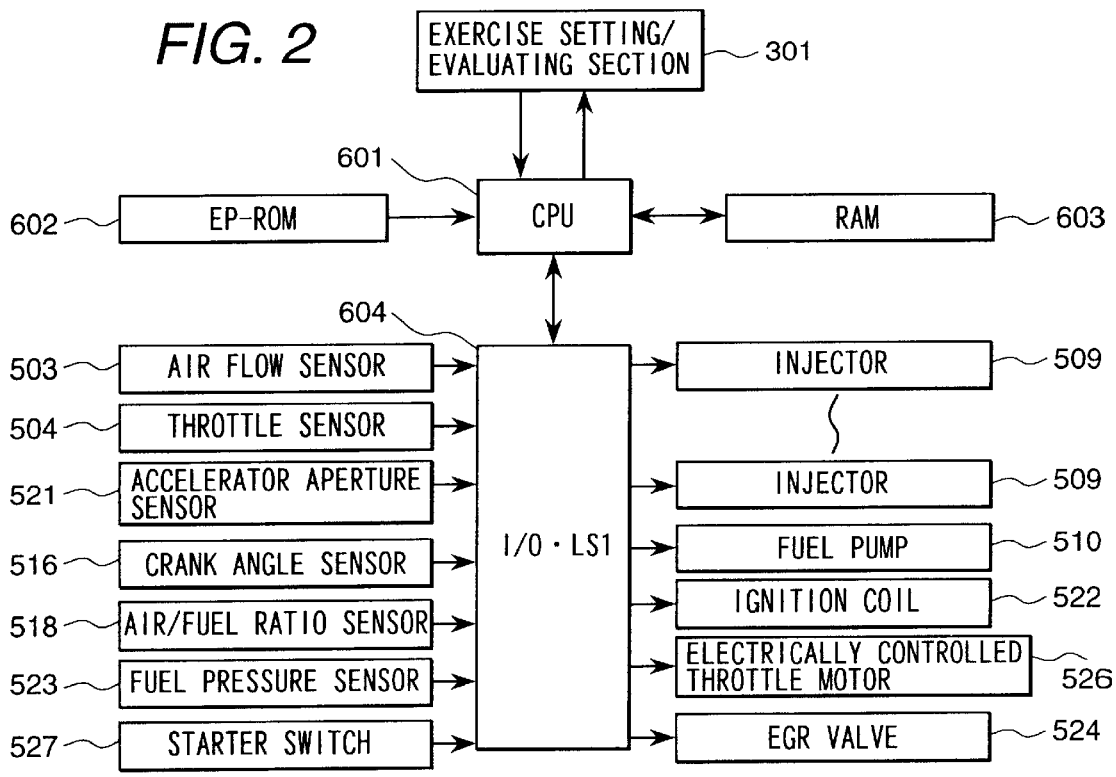
FIG. 2 is a block diagram illustrating the control system of the in-cylinder injection engine utilizing the CPU diagnosing device of the present invention.

Referring now to FIG. 2, the control unit 515 comprises a CPU 601, a ROM 602, a RAM 604 and an I/O LSI 604 including an A/D converter, which accepts inputs signals from the aforementioned sensors, which can measure (detect) the operating state of the engine, an accelerator aperture sensor (APS) 521, a fuel pressure sensor 523 and a starter switch 527. The control unit 515 executes prescribed operations of arithmetic processing, outputs various control signals computed as results of these arithmetic operations, and supplies each injector 509, ignition coil 522, electrically controlled throttle motor 526, EGR valve 524 and so forth with prescribed control signals to execute fuel feed control, ignition timing control, throttle aperture control, EGR control and so on.

Figure 3:
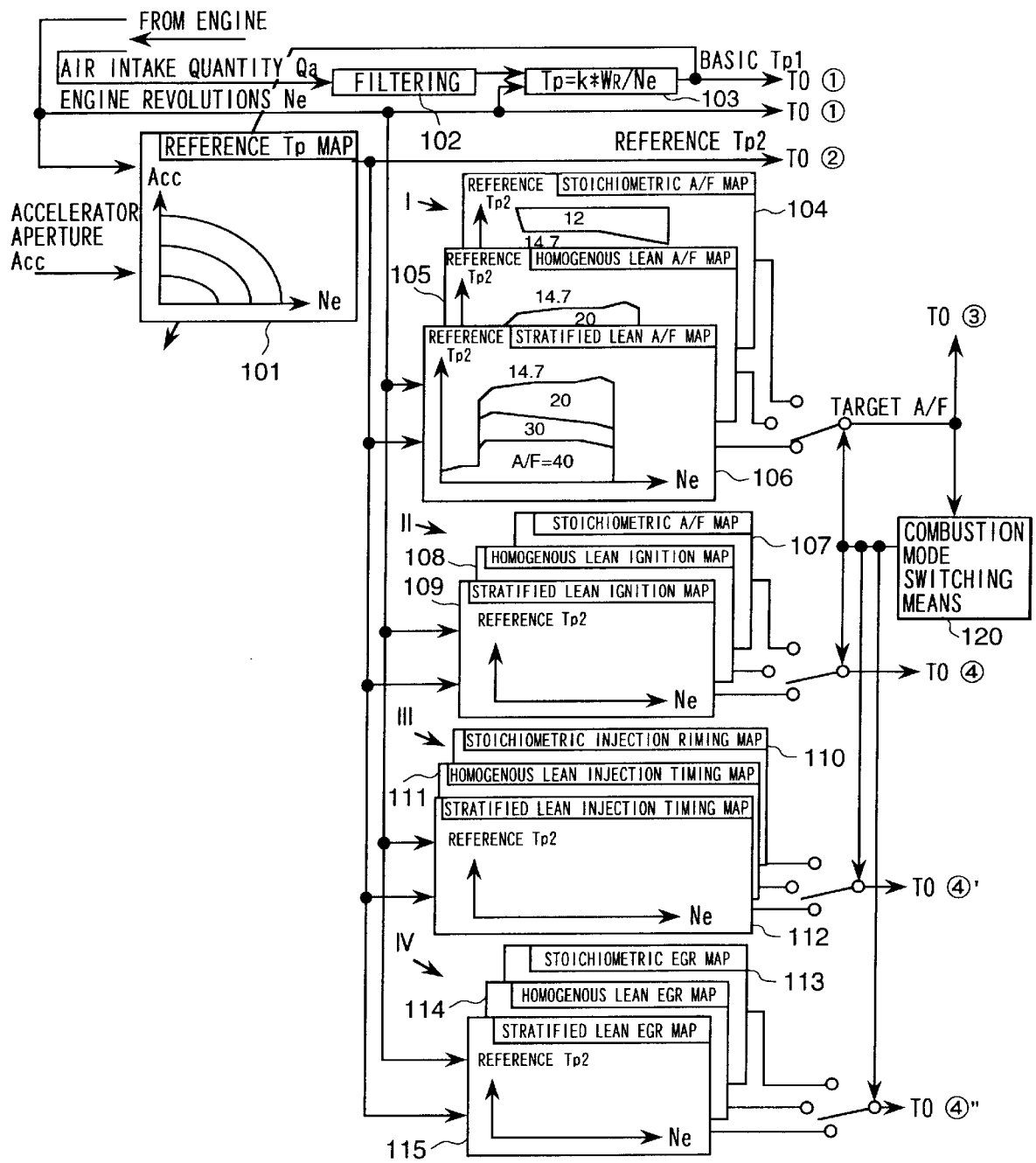
FIG. 3 is a former stage control block diagram of the engine control device.
Figure 4:
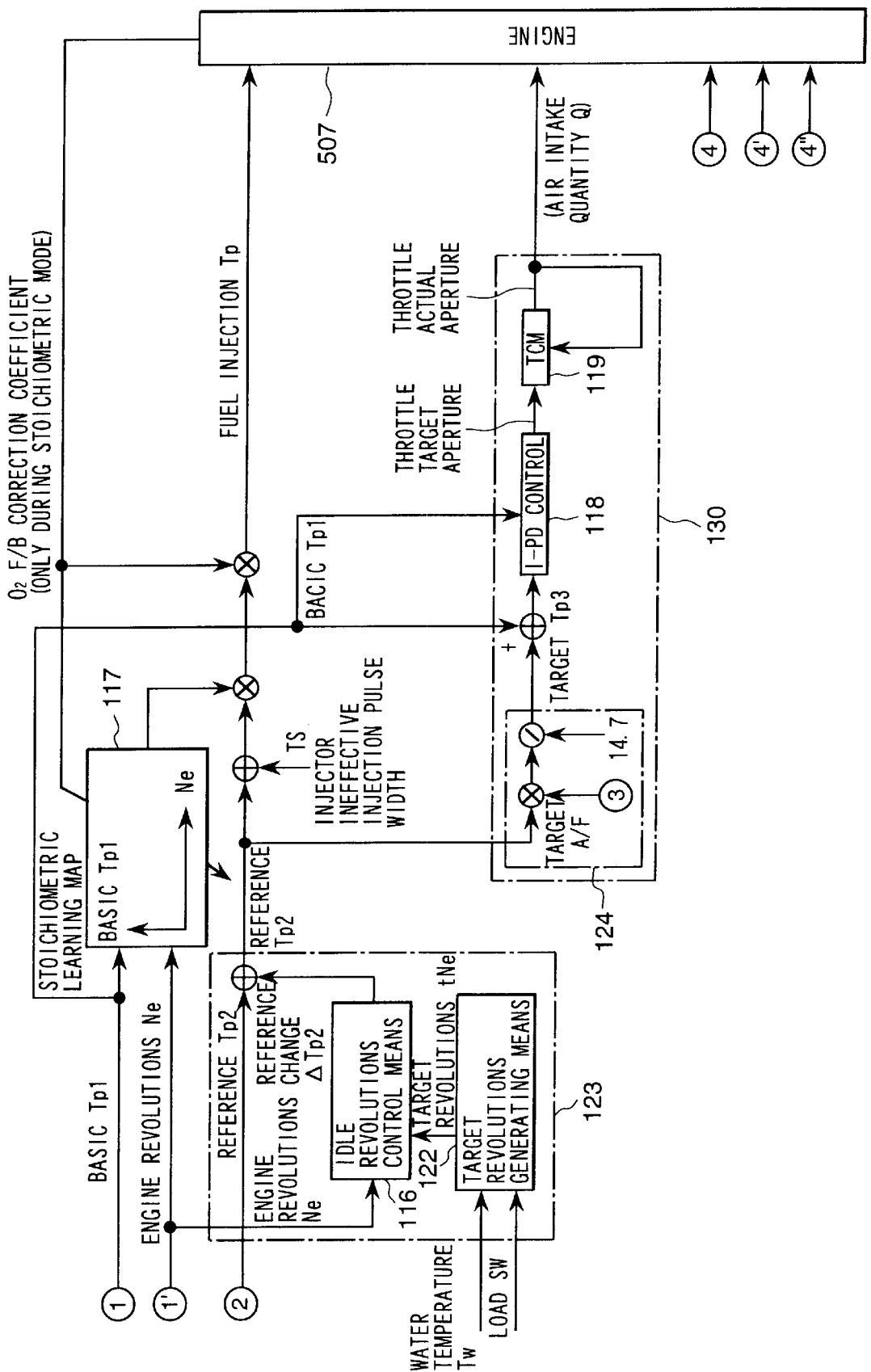
FIG. 4 is a latter stage control block diagram of the engine control device.

FIG. 3 and FIG. 4 shows an overall outline of a block diagram of controls executed by the control unit 515 in the in-cylinder injection engine 507.

The signal of the air intake flow quantity Qa detected by the air flow sensor 503 is filtered by a filtering means 102. Next, a basic fuel injection quantity determining means 103 divides the air intake quantity Qa by the engine revolutions Ne, and simultaneously, a basic fuel injection pulse width per cylinder, i.e. a basic fuel injection quantity Tp1, is figured by multiplication by a coefficient k which makes the air/fuel ratio stoichiometric (A/F=14.7).

When in the stoichiometric mode, in order to compensate for deviations in characteristics over time of the air flow sensor 503 and the injector 509, an $O_2F/B$ correction coefficient to be used for calculating a fuel injection quantity Tp (described below) is caused to be learned for each operation point determined by a basic fuel injection quantity correction means 117 from the basic fuel injection quantity Tp1 and the engine revolution Ne.

Also, in a reference fuel injection quantity determining means 101, a reference fuel injection quantity Tp2 which is to serve as the reference for a target fuel injection quantity Tp3 is figured out from a reference Tp map from the engine revolutions Ne and an accelerator aperture Acc in the same dimension as the basic fuel injection quantity Tp1.

The relationship between the basic fuel injection quantity Tp1 and the reference fuel injection quantity Tp2, is set in advance that at an operation point determined by the basic fuel injection quantity Tp1 and the engine revolutions Ne so that the reference fuel injection quantity Tp2 during operation in the stoichiometric mode be equal to the basic fuel injection quantity Tp1. However, the aforementioned map of the reference fuel injection quantity Tp2 is rewritable so that, in view of possible unevenness of sensors and the like in actual vehicles, the reference fuel injection quantity Tp2 (reference Tp) can be learned on the basis of the basic fuel injection quantity Tp1 (actual Tp) when in the stoichiometric mode.

In this mode of implementation, the respective maps of the air/fuel ratio, ignition timing, fuel injection timing and EGR ratio, which are control parameters of the engine 507, can be searched with two variables (i.e. the engine revolutions Ne and the reference fuel injection quantity Tp2) as axes. Since the reference fuel injection quantity Tp2 is presented as a function of the load on the engine, the axis of the reference fuel injection quantity Tp2 can also serve as the axis of the accelerator aperture Acc and further coincides with the basic fuel injection quantity Tp1 when in the stoichiometric mode.

The map of the air/fuel ratio setting map I, out of the aforementioned parameter, consists of three maps including a stoichiometric A/F map 104, a homogeneous lean A/F map 105 and a stratified lean A/F map 106. The ignition timing map 11 consists of three maps including a stoichiometric ignition map 107, a homogeneous lean ignition map 108 and a stratified lean ignition map 109. The ignition timing map 111 consists of three maps including a stoichiometric ignition timing map 110, a homogeneous lean ignition timing map 111 and a stratified lean ignition timing map 112. The EGR ratio map IV consists of three maps including a stoichiometric EGR map 113, a homogeneous lean EGR map 114 and a stratified lean EGR map 115. The determination as to which parameters to use, including the air/fuel ratio, ignition timing, fuel injection timing and EGR ratio is determined by a combustion mode switching means 120. (described below with reference to FIG. 7).

Both the air intake flow quantity Q and the fuel injection quantity Tp, which are the two target elements determining the air/fuel ratio in engine operation, are calculated on the basis of the reference fuel injection quantity Tp2. The fuel injection quantity Tp is obtained by adding, after adding with a reference fuel injection quantity correction means 123, a reference variation ΔTp2 to the reference fuel injection quantity Tp2 to obtain a corrected reference fuel injection quantity Tp21, an ineffective injection pulse width TS of the injector 509 to this reference fuel injection quantity Tp2. In a case of stoichiometric control, it is obtained by correcting with the basic fuel injection quantity Tp1 followed by multiplication by the $O_2F/B$ correction coefficient.

Regarding the air intake flow quantity Q, as the corrected reference fuel injection quantity Tp2 referred to above enters a throttle aperture setting means 130, a target fuel injection quantity calculating means 124 multiplies the reference fuel injection quantity Tp2' by the target air/fuel ratio (e.g. 40) and divides the product by the stoichiometric air/fuel ratio 14.7 to figure out the target fuel injection quantity Tp3 needed for achieving the aforementioned target air/fuel ratio. The target fuel injection quantity Tp3, as a matter of control, is not only used as the target value of the fuel injection quantity, but as the target value of the air intake quantity.

The target fuel injection quantity Tp3 and the basic fuel injection quantity Tp1 are compared by an I-PD control means 118 to be described afterwards, and used to apply feedback control to the throttle aperture and to control the target air intake flow quantity Q by causing the basic fuel injection quantity Tp1 to follow the target fuel injection quantity Tp3. The desired air/fuel ratio can be adjusted with the air intake flow quantity Q and the fuel injection quantity Tp which are set as described above.

The engine control unit 515 in this mode of implementation is constantly performing feedback control over the air intake flow quantity Qa on the basis of variations in fuel feed with the electrically controlled throttle valve 505*a*. As the proportion of fresh air which makes up the air intake flow quantity Qa increases, the aperture of the electrically controlled throttle valve 505*a* is narrowed or, when the EGR valve 524 is to be opened, as the proportion of fresh air decreases and the aperture of the electrically controlled throttle valve 505*a* is widened.

The I-PD control means 118 compares the target fuel injection quantity Tp3 (target Tp) and the basic fuel injection quantity Tp1 (actual Tp), and performs Tp feedback control to determine the throttle target aperture from the deviation between them, a manipulated variable TORDTY, which is the torque equivalent of the throttle target aperture, is obtained by Equation (1):

$$TORDTY = TORDT1 + TPFB \quad (1)$$

Here, TORDT1 is the manipulated variable of 10 ms before, and TPFB, a controlled variable which is the Tp feedback equivalent, being obtained by Equation (2):

$$TPFB = TPFBI + TPFBP + TPFBD \quad (2)$$

Here, TPFBI is the integral component of the Tp feedback equivalent, TPFBP, the proportional component of the Tp feedback equivalent, and TPFBD, the differential component of the Tp feedback equivalent, the total of these being used as a controlled variable. The integral component TPFBI, the proportional component TPFBP and the differential component TPFBD are obtained by Equations (3) through (5):

$$TPFBI = KTPFBI\# \times DELTP \quad (3)$$

where $DELTP = TARGTP - TP$.

Here, KTPFBI is an integral gain, and DELTP is the deviational component of Tp. TARGTP is the target fuel injection quantity Tp3, which, as stated above, is equal to basic fuel injection quantity Tp1 under stoichiometric control, but, under lean control, is figured by multiplying the reference fuel injection quantity Tp2' by the target air/fuel ratio and dividing the product by the stoichiometric air/fuel ratio 14.7.

$$TPFBP = KTPFBP\# \times (TpK1 - TP) \quad (4)$$

$$TPFBD = KTPFBD\# \times (2 \times TPK1 - TPK2 - TP) \quad (5)$$

Thus, for Tp feedback control, PID control by the analog system is rewritten into a difference equation for discrete time and further, by using a speed algorithm of adding the controlled variable TPFB to the manipulated variable TORDT1 of one unit time before. The control itself is provided with a character to restrain any abrupt change in throttle aperture due to instantaneous interruption of APS and AFM signals, instantaneous stoppage, noise and the like. The throttle target aperture command (manipulated variable) TORDTY is outputted to a throttle control module (TCM) 119 to control the throttle aperture.

Figure 5:
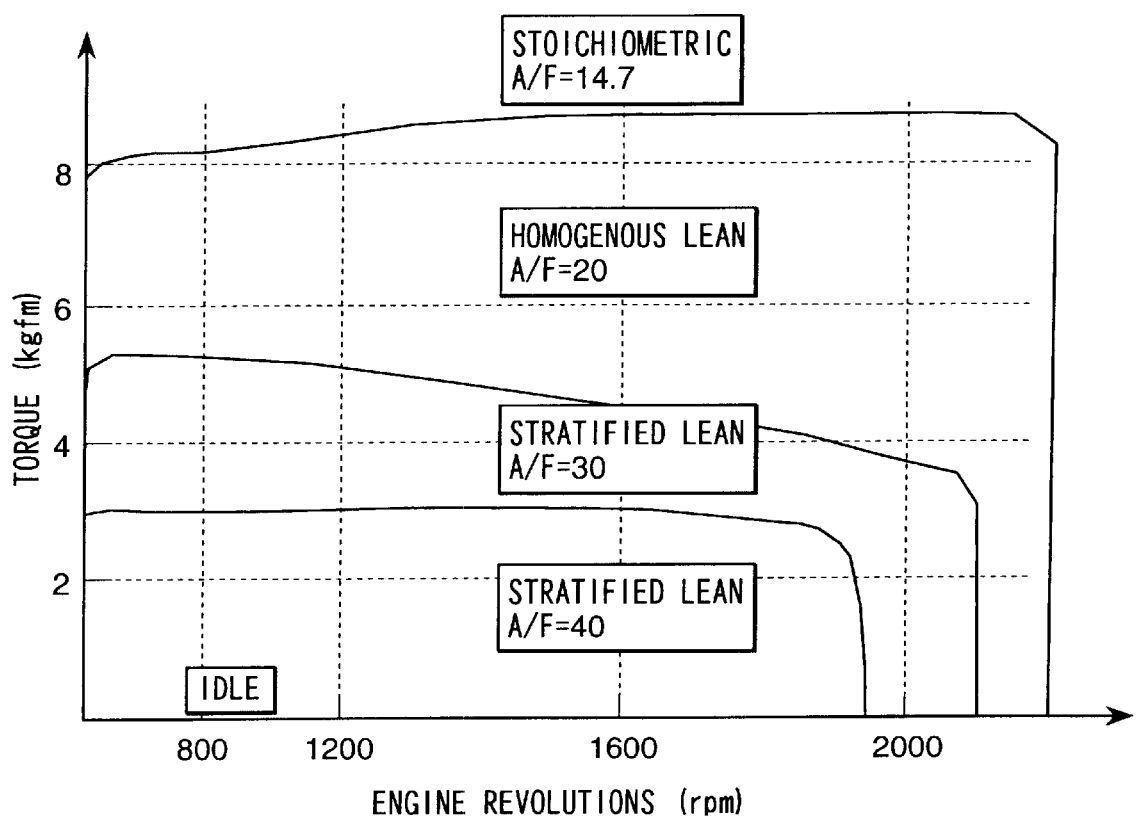
FIG. 5 is a diagram illustrating an example of air/fuel ratio setting for the engine control device.

FIG. 5 shows an air/fuel ratio setting map I of the in-cylinder injection engine 507 in this mode of implementation, and development into the three maps of stoichiometric A/F, homogeneous lean A/F and stratified lean A/F based on it. As shown in this air/fuel ratio setting map I, it is seen that the air/fuel ratio in the idle region 40 is in the stratified lean mode, but this map refers to a warmed state of the engine, and when the engine is cold, since no stable combustion is possible in the stratified lean mode, stoichiometric combustion takes place, wherein the maps of the air/fuel ratio, ignition timing, fuel injection timing and EGR ratio, which are control parameters of the engine 507, are searched according to the respective maps in the stoichiometric mode.

Figure 6:
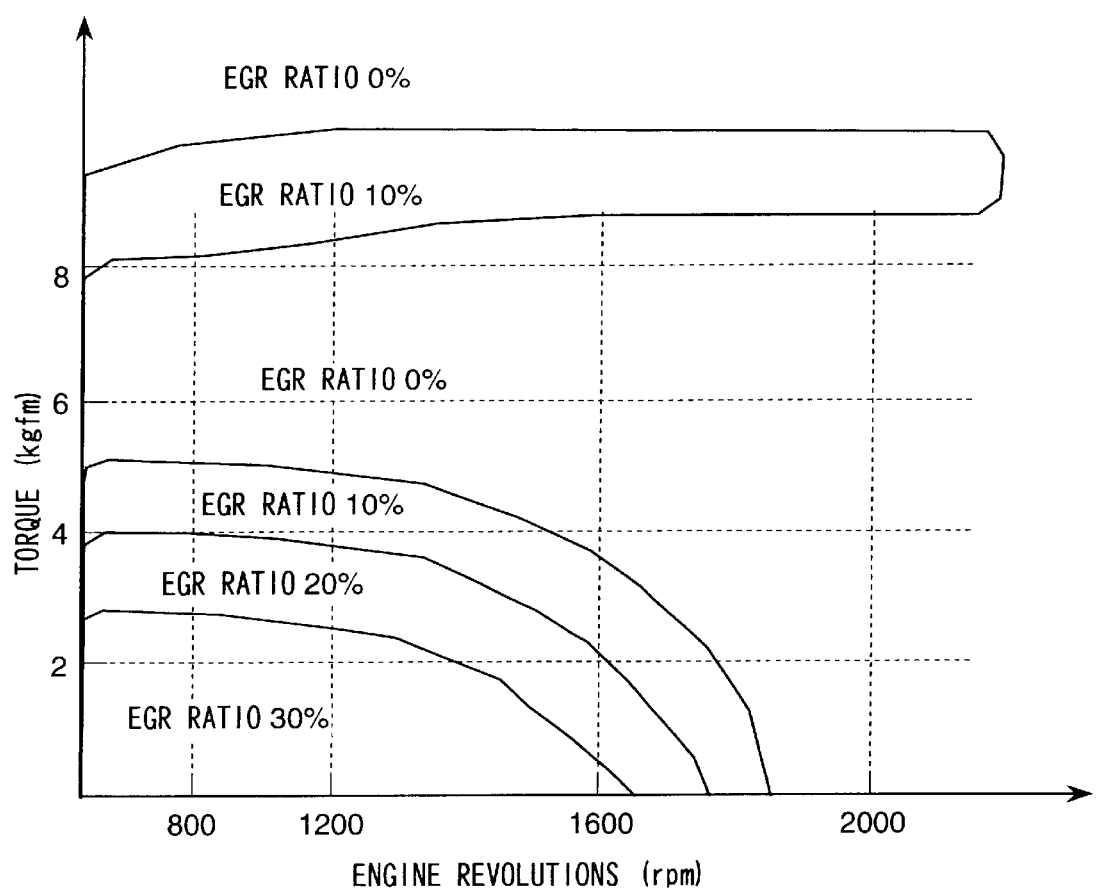
FIG. 6 is a diagram illustrating an example of EGR ratio setting for the engine control device.

FIG. 6 shows the relationships of two variables, including the torque and engine revolutions, to the EGR ratio and compares it with the air/fuel ratio setting map I. As shown, while an EGR unit is operated under stratified lean control and stoichiometric control, it is not operated under homogeneous lean control.

Figure 7:
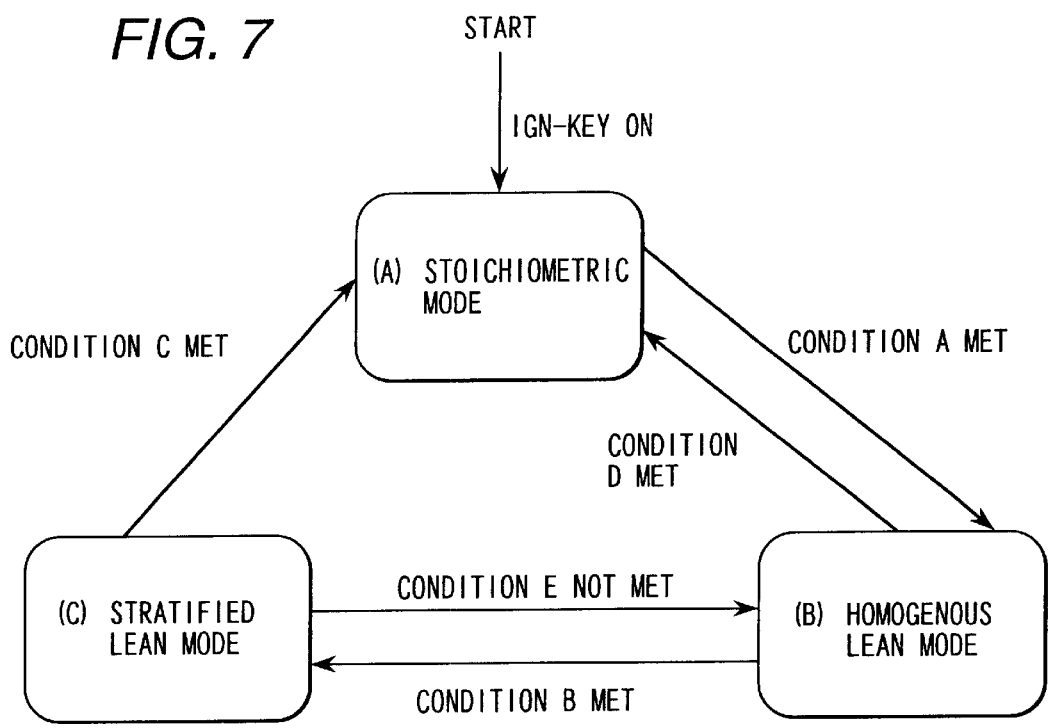
FIG. 7 is a state transition diagram of the combustion mode switching means of the engine control device.

It is the combustion mode switching means 120 that determines the combustion mode in this way and particulars of its processing will be described with reference to FIG. 7. FIG. 7 is a state transition diagram of the combustion mode switching means 120. When the engine 507 is started, it first takes on (A) the stoichiometric mode. In order for a shift from (A) the stoichiometric mode to (B) the homogeneous lean mode to take place, condition A should be met. Further, when condition B is met during operation in (B) the homogeneous lean mode, a shift to (C) the stratified lean mode take place. Then, when condition C is met during operation in (C) the stratified lean mode, operation will return to (A) the stoichiometric mode, and when condition E is met during operation in (C) the stratified lean mode, operation returns to (B) the homogeneous lean mode. Incidentally, when condition D comes to be met during operation in (B) the homogeneous lean mode, operation returns to (A) the stoichiometric mode. Examples of conditions A through E are given below.

Condition A: All of the following requirements A1 through A3 should be satisfied.

A1: The target A/F retrieved from the stoichiometric air/fuel ratio map $104 \geq 20$ A2: The engine cooling water temperature $TWN \geq 40° C$.

A3: The volume increase coefficient after the engine start=0

Condition B: The target A/F retrieved from the homogeneous lean air/fuel ratio map $105 \geq 30$ Condition C: The condition for a fuel cut under deceleration has been satisfied.

Condition D: The target A/F retrieved from the homogeneous lean air/fuel ratio map $105 \geq 19$ Condition E: The target A/F retrieved from the stratified lean air/fuel ratio map $106 \geq 28$ When the combustion mode is determined by the combustion mode switching means 120 in this say, setpoints are retrieved for the ignition timing, ignition timing and EGR ratio, besides the air/fuel ratio, from their respective maps in each mode.

Figure 8:
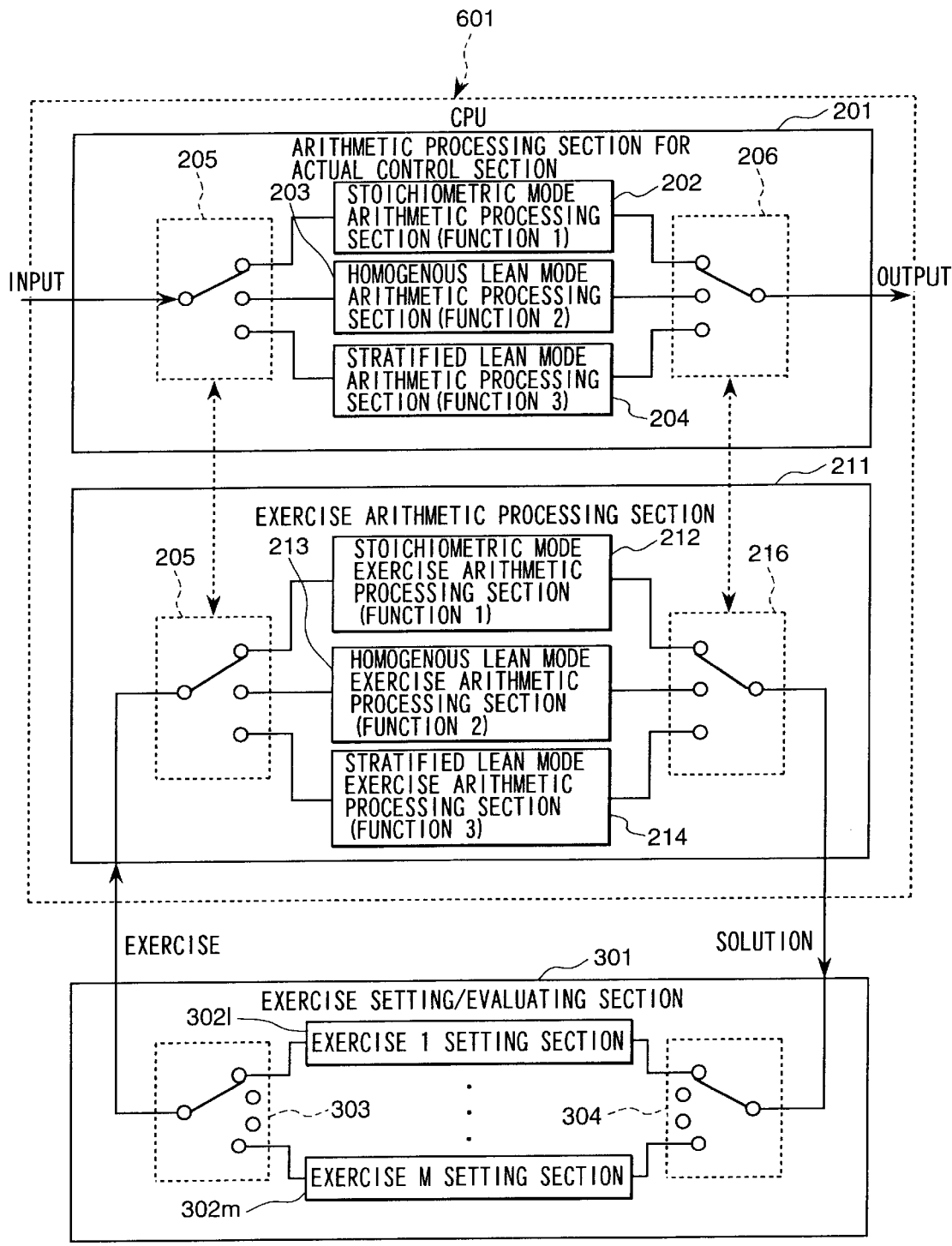
FIG. 8 is a block diagram illustrating a CPU diagnosing device in one embodiment of the present invention.

Next, a CPU diagnosing device according to the present invention will be described with reference to FIG. 8. A CPU 601 realizes an actual control arithmetic processing section 201 and an exercise arithmetic processing section 211 by way of software and transfer data to and from an externally provided exercise setting/evaluating section 301.

The actual control arithmetic processing section 201, which is to perform effective arithmetic processing according to a selected arithmetic processing state, includes an stoichiometric mode arithmetic processing section (function 1) 202, a homogeneous lean mode arithmetic processing section (function 2) 203 and a stratified lean mode arithmetic processing section (function 3) 204 for carrying out arithmetic processing by individual functions respectively corresponding to the three arithmetic processing states (control execution states) of the CPU 601 (i.e., (A) the stoichiometric mode, (B) the homogeneous lean mode and (C) the stratified lean mode) plus an input side switch 205 and an output side switch 206 for selectively using one of these arithmetic processing sections. The input side switch 205 and the output side switch 206 can be deemed to constitute the combustion mode switching means 120 shown in FIG. 3.

The exercise arithmetic processing section 211 includes a stoichiometric mode exercise arithmetic processing section (function 1) 212, a homogeneous lean mode exercise arithmetic processing section (function 2) 213 and a stratified lean exercise arithmetic processing section (function 3) 214 for carrying out arithmetic processing of exercises by individual functions respectively corresponding to the three arithmetic processing states (control execution states) of the CPU 601, i.e., (A) the stoichiometric mode, (B) the homogeneous lean mode and (C) the stratified lean mode, plus a function selecting section 215 and a solution selecting section 216 for selectively using one of these exercise arithmetic processing sections.

The function selecting section 215 and the solution selecting section 216 are switch elements, and can be switched over to respectively the same positions as the input switch 205 and the output switch 206 to match the combustion mode selected by the combustion mode switching means 120. Thus, the CPU 601 switches over the function selecting section 215 so that the exercise arithmetic processing section 211 takes on the same combustion mode as the one selected by the combustion mode switching means 120, selects with the solution selecting section 216, which is a switch element, a solution calculated by one of the functions in one of the stoichiometric mode exercise arithmetic processing section 212, the homogeneous lean mode exercise arithmetic processing section 213 and the stratified lean exercise arithmetic processing section 214 so as take on the same position as the function selecting section 215, and outputs the solution to the exercise setting/evaluating section 301.

The exercise setting/evaluating section 301 has exercise 1 setting sections $302_1$ through $302_m$ for setting m kinds of exercises, selects with an exercise selecting section 303, exercise 1 through exercise m irrespective of the state of the CPU, and transmits it to the CPU 601. The CPU 601 selects with the function selecting section 215 a function so that the received exercise be solved by a function intrinsic to the state that can be currently taken, and gives it to one of the exercise arithmetic processing sections 212, 213 and 214.

Figure 9:
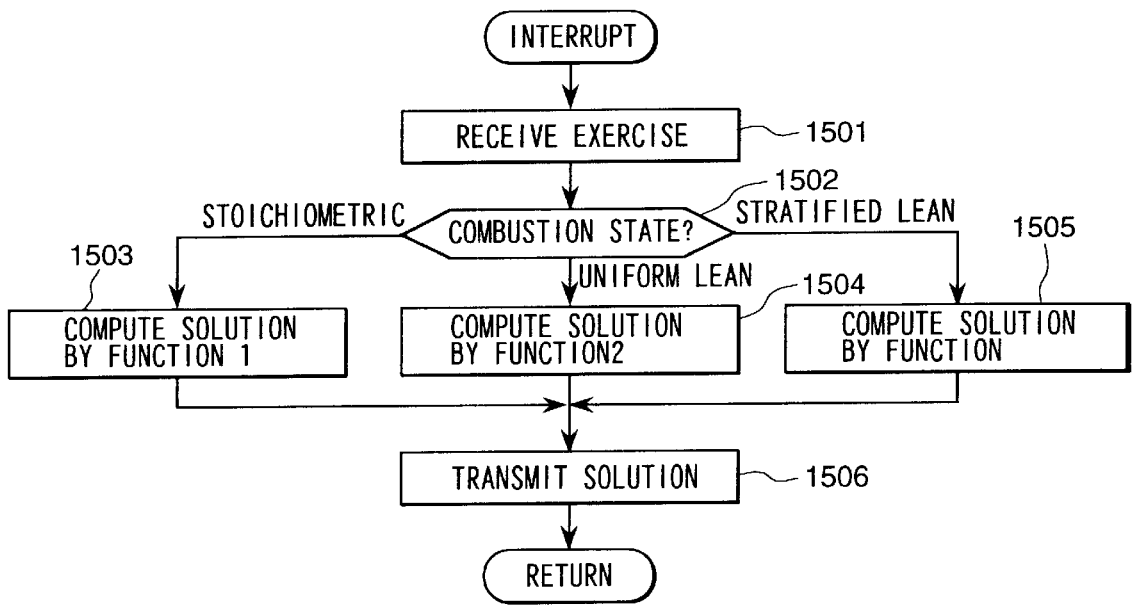
FIG. 9 is a flowchart showing the operation of the CPU diagnosing device according to the present invention.

Next will be described the operation of the CPU diagnosing device having the above-described configuration with reference to a flowchart shown in FIG. 9. The sequence of processing is executed in a fixed period (e.g. 10 ms), beginning with interruption and coming back to the beginning with "Return". At the beginning, an exercise is received (step 1501), and the current state of combustion (combustion mode) is determined (step 1502).

Here, if it is in the stoichiometric mode, the solution is calculated by function 1 matching the stoichiometric mode (step 1503); if it is in the homogeneous lean mode, the solution is calculated by function 2 matching the homogeneous lean mode (step 1504); or if it is in the stratified lean mode, the solution is calculated by function 3 matching the stratified lean mode (step 1505). And the sequence is completed with the transmission of the result of solution calculation (solution) (step 1506).

Figure 10:
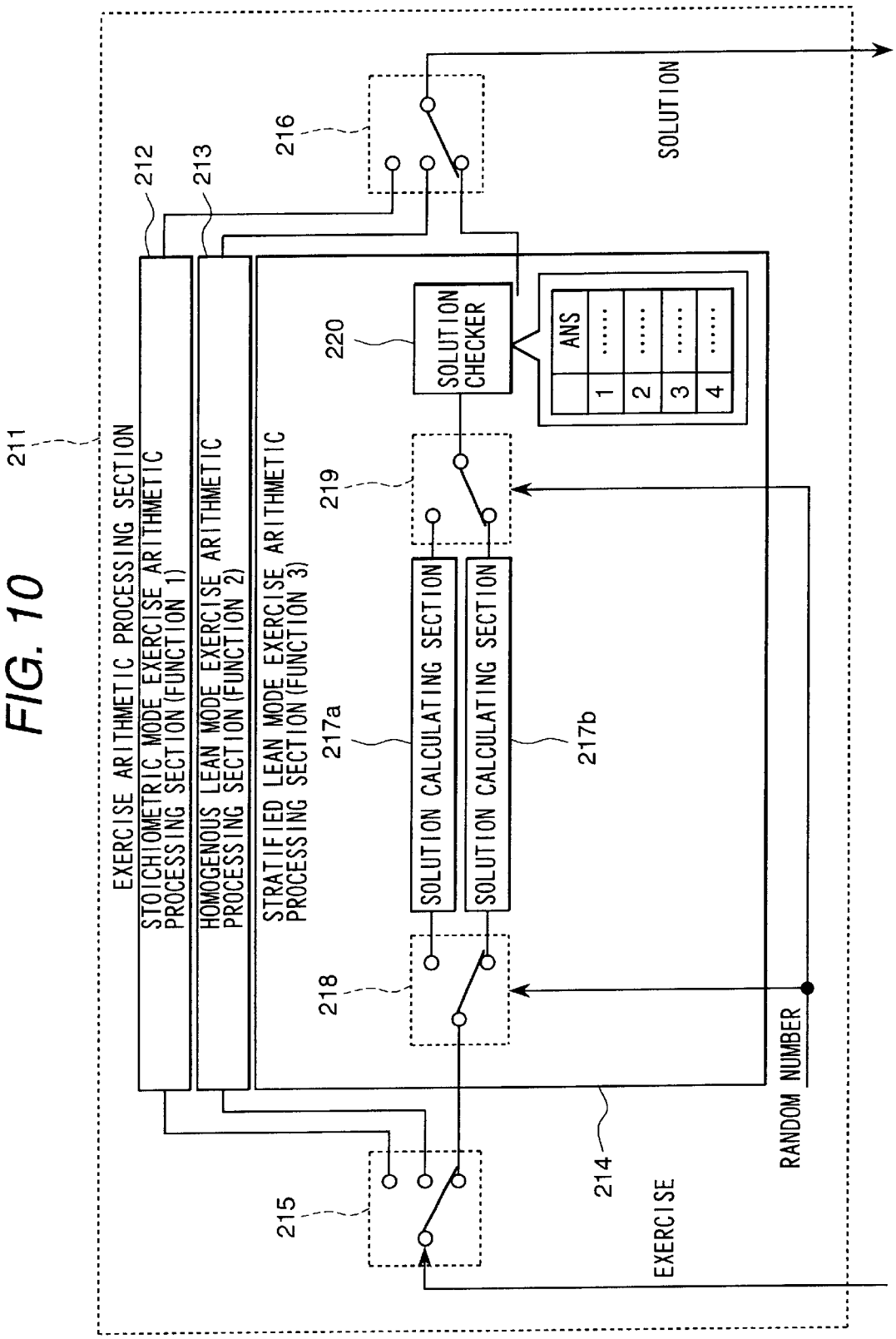
FIG. 10 is a block diagram illustrating an exercise calculating section in a CPU diagnosing device in another embodiment of the invention.

In another mode of implementation, the exercise arithmetic processing sections 213 and 214, as illustrated in FIG. 10, can have a plurality of solution calculating sections 217a and 217b as exercise expanding means, and can select for use either one of the solution calculating sections 217a and 217b with selecting sections 218 and 219 taking the same positions. In this instance, the exercise is assigned by the function selecting section 215 to a function representing the current state of the CPU, and is assigned by a random number selecting section 218 having a random number as its input to either one of the solution calculating section 217a and 217b.

The selecting section 219, taking the same position as the selecting section 218, inputs to a solution checker 220 the result of calculation of the exercise (calculated solution). The solution checker 220 checks whether or not the calculated solution is the same as a solution stored in advance and, if so, transmits the solution to the exercise setting/evaluating section 301 via the solution selecting section 216. The exercise setting/evaluating section 301 receives from solution selecting section 304 the solution from the CPU 601.

Figure 11:
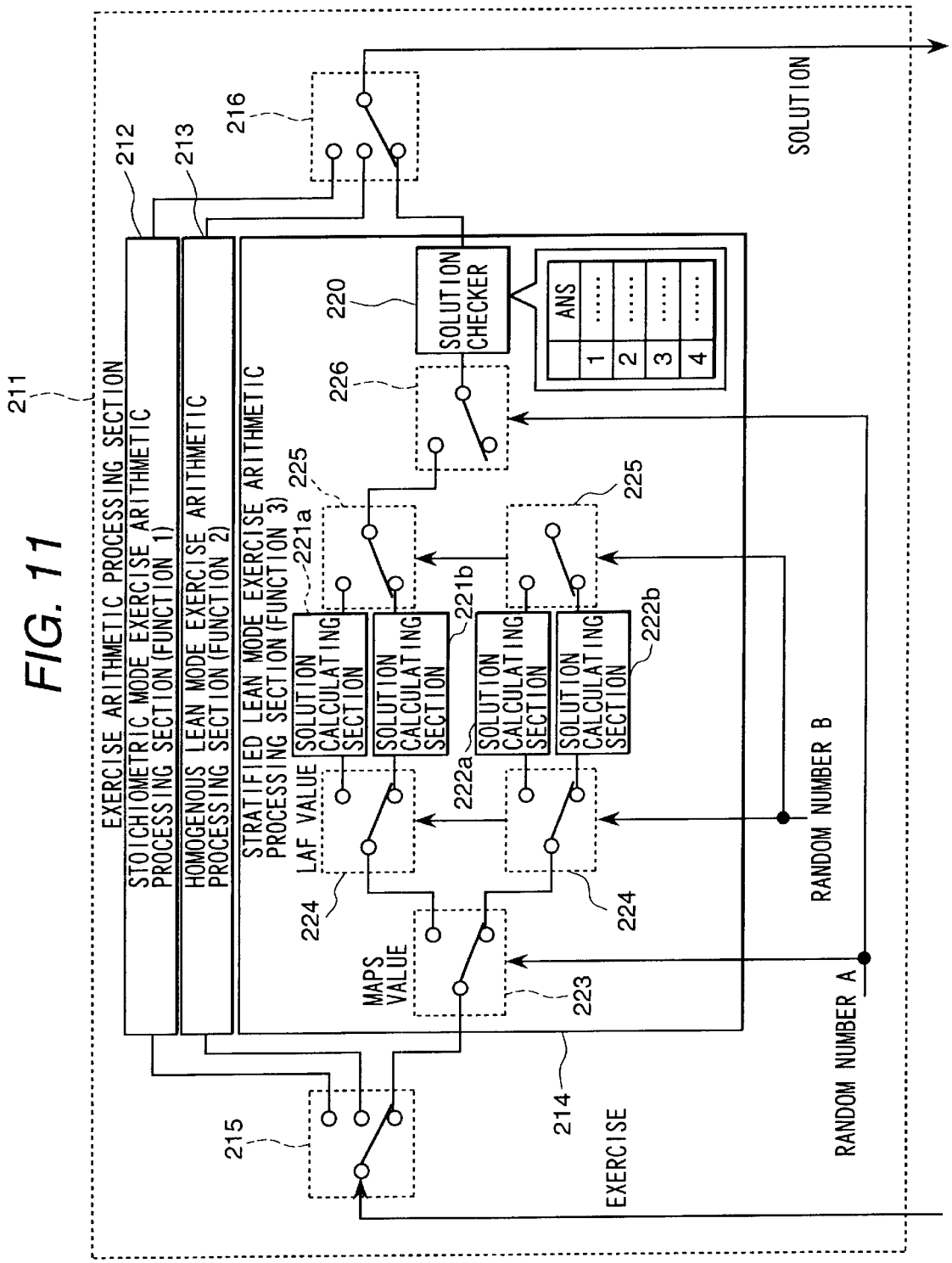
FIG. 11 is a block diagram illustrating an exercise calculating section in a CPU diagnosing device in another embodiment of the invention.

FIG. 11 illustrates another mode of exercise setting, which has a first group of solution calculating sections 221a and 221b and a second group of solution calculating sections 222a and 222b. In this mode of implementation, the exercise is assigned by the function selecting section 215 to a function representing the current state of the CPU, and is assigned by a random number selecting section 223 having a random number A as its input to either one of the first group of solution calculating sections 221a and 221b or the second group of solution calculating sections 222a and 222b. The exercise is further assigned by a random number selecting section 224 having a random number B as its input to one solution calculating section of either group. On the solution output side, too, equivalent selecting sections 225 and 226 are provided, and the calculated solution is delivered to the solution checker 220.

Here, supposing that the variety of exercises is m kinds, the number of branches provided by the function selecting section 215 is n, the variety of selecting means by the random number of the first stage is p1 kinds, and the variety of selecting means by the random number of the second stage is p2 kinds, then exercise calculations can be expanded to m×n×p1×p2 kinds.

As random numbers for the above-described selection of a solution calculating section, the value of some or every digit of a timer or counter of the CPU 211 after the lapse of a prescribed length of time can be used, and the position of each selecting section can be inverted between odd and even numbers.

Figure 12:
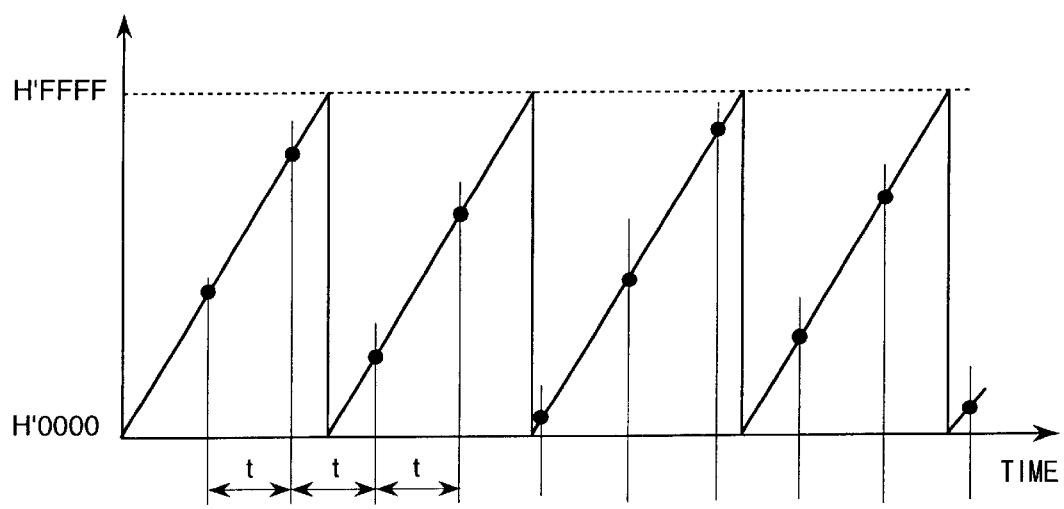
FIG. 12 is an explanatory diagram illustrating the operation of a timer and a counter of the CPU.

The generation of random numbers will be described with reference to FIG. 12 and FIG. 13. FIG. 12 shows a consecutively increasing two byte timer or counter waveform of the CPU 601. Here the count of the aforementioned timer or counter is read in a certain fixed period t. The certain fixed period means, for instance, the counter's count is taken in at an instruction during the 10 ms period JOB of the CPU 601, but the length of the 10 ms period JOB itself need not be exactly 10 ms, an error of a few $\mu$s to a few tens of $\mu$s being tolerable. In FIG. 12, the counter's counts taken in the 10 ms period JOB are marked with black round signs.

Figure 13:
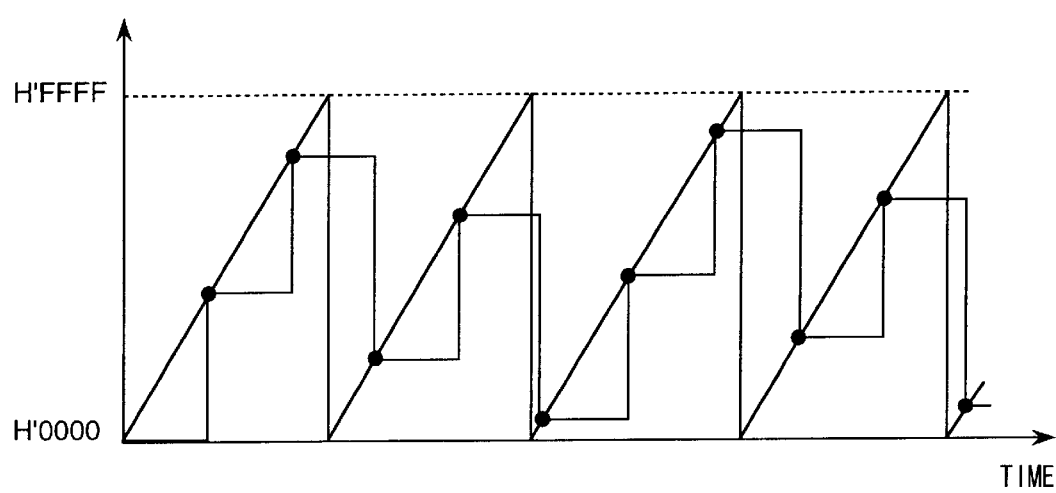
FIG. 13 is an explanatory diagram illustrating the operation and take-in timing of the timer and the counter of the CPU.

FIG. 13 illustrates the counts of the timer or counter taken every 10 ms JOB are represented in a rectangular wave. When this result is to be applied to the selecting section 218 or the like using a random number, it is so set that, for instance, the switch is turned upward if the number is even or upward if the number is odd.

Figure 14:
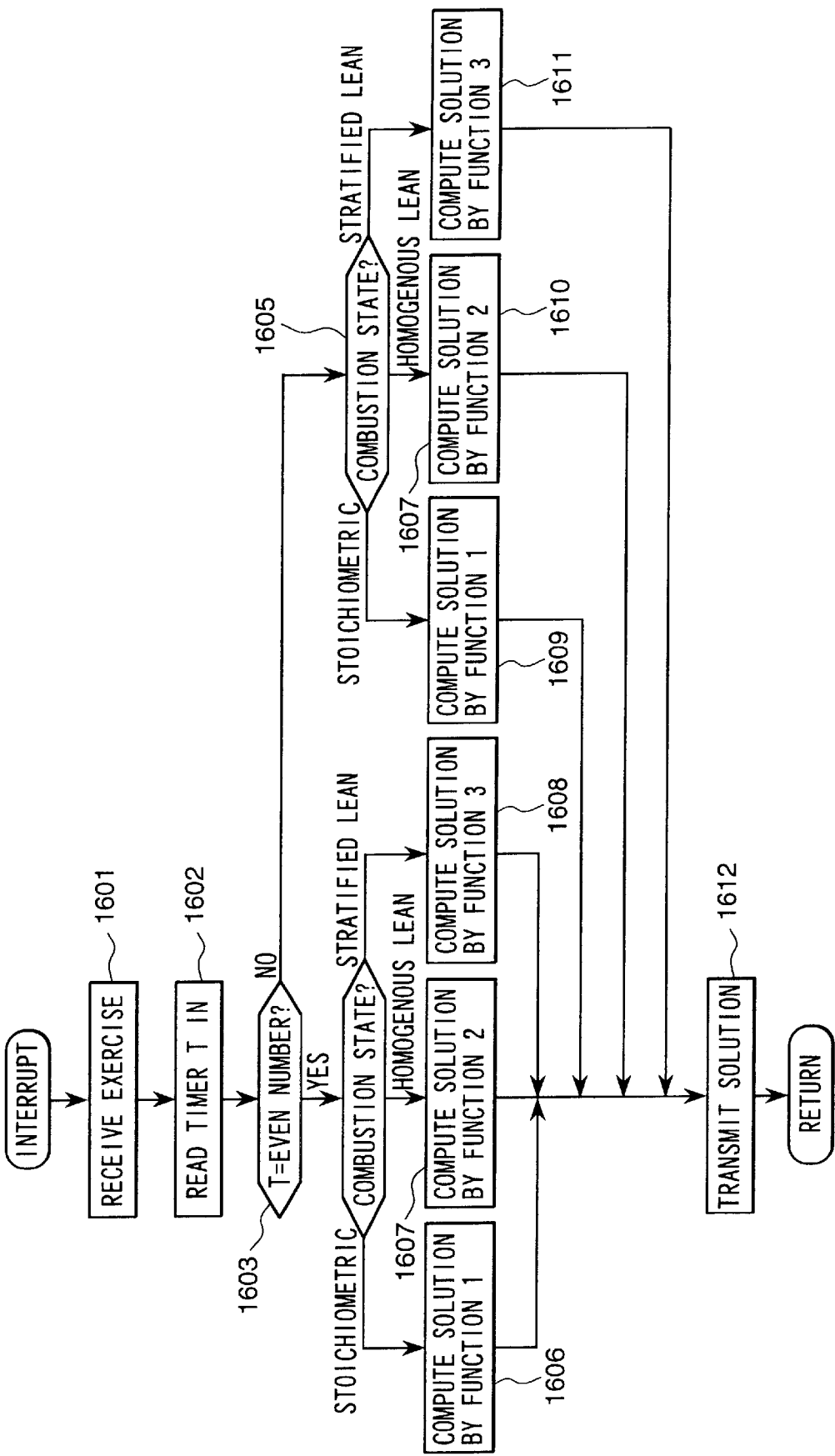
FIG. 14 is a flowchart showing the operation of the CPU diagnosing device according to the present invention.

Next will be described the operation of the CPU diagnosing device including the above-described exercise expanding means (what is illustrated in FIG. 10) with reference to the flowchart shown in FIG. 14. In this case, too, the sequence of processing is executed in a fixed period (e.g. 10 ms), beginning with interruption and coming back to the beginning with "Return". At the beginning, an exercise is received (step 1601), and then the timer count T is read in (step 1602). Next, whether or not the timer count T is an even number is determined (step 1603).

Here, if the timer count T is an even number, the sequence goes ahead to step 1606 or, if not, it proceeds to step 1605. This means switching of the selecting section 218. If the count is an even number, the solution calculating section 217a is activated to cause the solution calculating section 217b to deactivate or, if conversely it is not an even number, the solution calculating section 217a deactivate and the solution calculating section 217b is activated.

In either case, the current state of combustion (combustion mode) is determined (step 1604 or step 1605). Here, if it is the stoichiometric mode, the solution is calculated by function 1 matching the stoichiometric mode (step 1606 or step 1609); if it is the homogeneous lean mode, the solution is calculated by function 2 matching the homogeneous lean mode (step 1607 or step 1610); or if it is the stratified lean mode, the solution is calculated by function 3 matching the stratified lean mode (step 1608 or step 1611). And the sequence is completed with the transmission of the result of solution calculation (solution) (step 1612).

Figure 15:
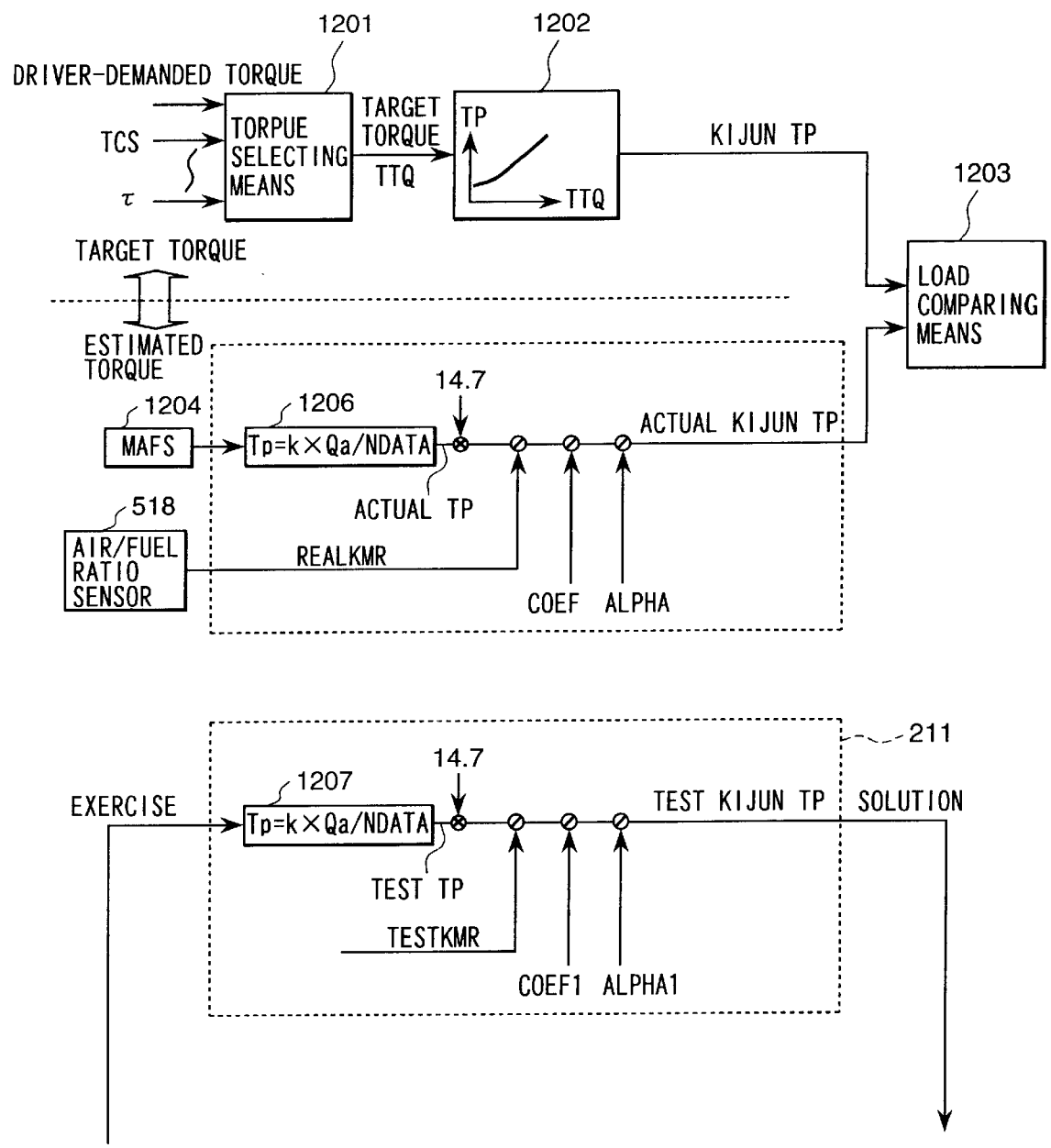
FIG. 15 is an explanatory diagram illustrating an example of incorporation of the CPU diagnosing device according to the present invention into an engine control device.

Next, specific examples of solution calculation will be described with reference to FIG. 15 and FIG. 16. In the example shown in FIG. 15, the CPU 601 is configured of three stages of blocks. The top stage calculates with a torque selecting means 1201 a target torque TTQ out of a driver-demanded torque, TCS and AT. It is further converted into a load value KIJUNTP by a load converting means 1202.

The middle stage, on the basis of an air intake quantity value Qa measured by an MAFS 1204, calculates the basic fuel injection quantity TP with a basic fuel injection quantity calculating section 1206, and calculates an actual load value Actual KIJUN TP by correcting it with a value REALKMR detected by the air/fuel ratio sensor 518 and correction coefficients COEF and ALPHA.

By comparing with a load comparing means 1203 KIJUNI TP of the top stage and Actual KIJJUN TP of the middle stage, sensors, calculations and actuators regarding loads can be diagnosed according to whether or not the target load and the actual load are equal or whether or not the difference is within a prescribed range. If the difference between the target load and the actual load is not smaller than a prescribed value, a fail-safe action such as stopping the actuators or restricting the torque is taken.

In order to check here where or not torque estimation at the middle stage is properly functioning, an exercise is presented at the bottom stage to what has the same block configuration as the middle stage (exercise arithmetic processing section 211) and the function is thereby checked.

A dummy value of the same dimension as the air intake quantity value Qa measured by the MAFS 1204 is inputted as an exercise to an exercise calculating section 1207 for the basic fuel injection quantity, a dummy basic fuel injection quantity TEST TP is calculated on the basis of that input value, and the actual load value Actual KIJUN TP is calculated by correcting it with the dummy value TESTKMR of the same dimension as the air/fuel ratio sensor and correction coefficients COEF1 and ALPHA1. TEST KIJUN TP so obtained transmitted as the solution to the exercise setting/evaluating section 301.

Here, when the CPU state is in the stoichiometric mode, a value in the vicinity of the air/fuel ratio A/F=REALKMR= 14.7 detected by the air/fuel ratio sensor 518 is used for load value calculation. At the same time, in the stoichiometric mode, exercise calculation is also performed by the exercise arithmetic processing section 211 with TESTKMR=14.7, which is close to the actual operating state, and the solution is thereby figured out.

However, when the CPU state is in the homogeneous lean mode, a value in the vicinity of the air/fuel ratio A/F= REALKlMlR=20 to 23 detected by the air/fuel ratio sensor 518 is used for load value calculation. At the same time, in the homogeneous lean mode, exercise calculation is also performed by the exercise arithmetic processing section 211 with TESTKMR=22, which is close to the actual operating state, and the solution is thereby calculated.

But, when the CPU state is in the stratified lean mode, a value in the vicinity of the air/fuel ratio A/F=REALKMR= 36 to 44 detected by the air/fuel ratio sensor 518 is used for load value calculation. Also, in the stratified lean mode, exercise calculation is performed by the exercise arithmetic processing section 211 with TESTKMR=40, which is close to the actual operating state, and the solution is thereby calculated.

Figure 16:
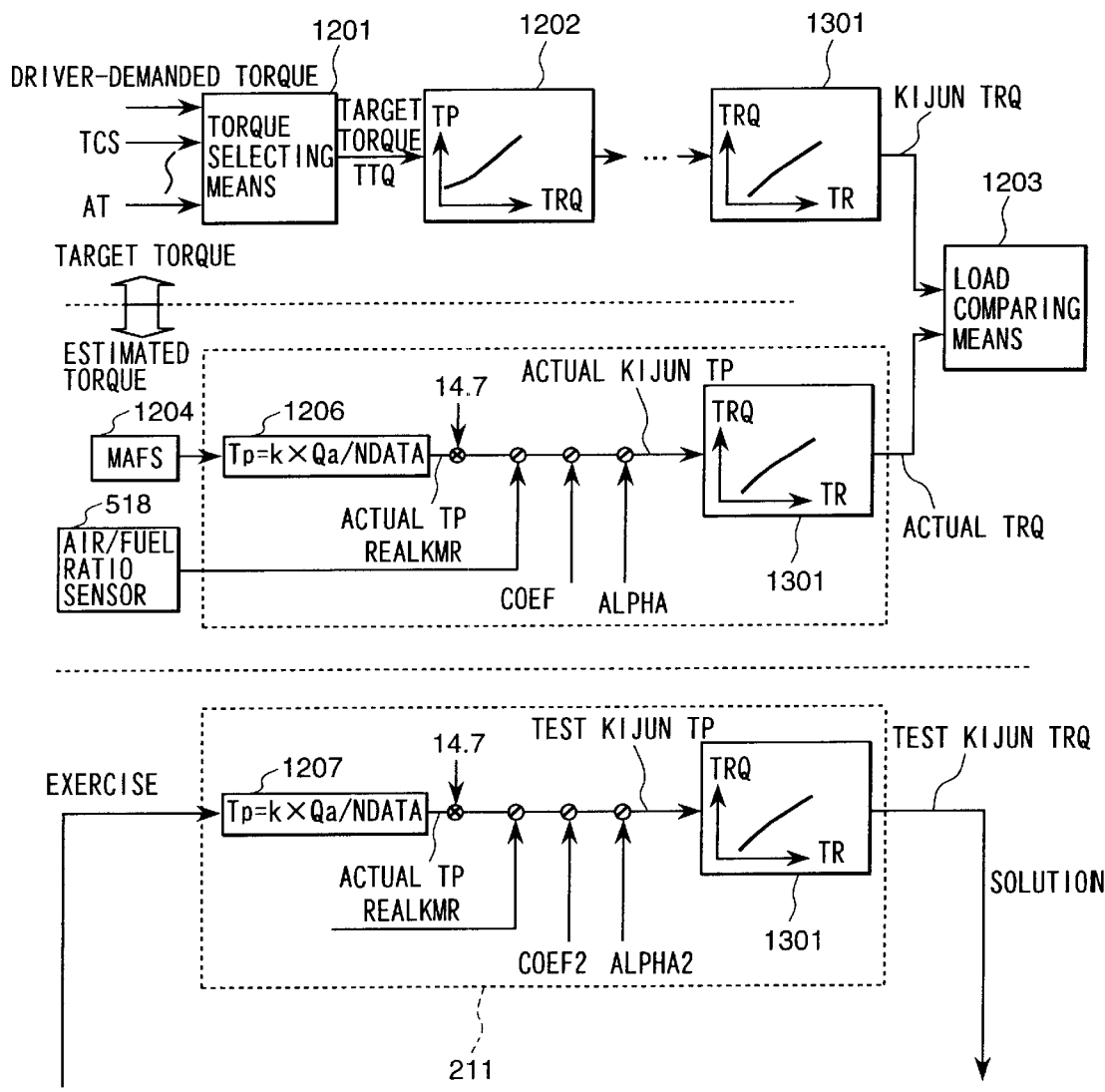
FIG. 16 is an explanatory diagram illustrating another example of incorporation of the CPU diagnosing device according to the present invention into an engine control device.

Referring now to FIG. 16, the top stage calculates with the torque selecting means 1201 a target torque TTQ out of a driver-demanded torque, TCS and AT. It is further converted into a load value KIJUNTP by the load converting means 1202 and then, after execution of functions including correction processing, is converted into a torque value by a torque converting means 1301.

The middle stage, on the basis of an air intake quantity value Qa measured by the MAFS 1204, calculates the basic fuel injection quantity TP with the basic fuel injection quantity calculating section 1206, calculates the actual load value Actual KIJUN TP by correcting it with the value REALKMR detected by the air/fuel ratio sensor 518 and correction coefficients COEF and ALPHA, and then converts it into a torque value KIJUN TRQ with the torque converting means 1301.

KIJUNI TRQ of the top stage and Actual KIJJUN TRQ of the middle stage calculated are compared by the load comparing means 1203, and if the target load and the actual load are equal or the difference between them is within a prescribed range sensors, calculations and actuators regarding torques can be diagnosed to be normal. But, if the difference between the target torque and the actual torque is not smaller than a prescribed value, a fail-safe action such as stopping the actuators or restricting the torque is taken.

In order to check here where or not torque estimation at the middle stage is properly functioning, an exercise is presented at the bottom stage to what has the same block configuration as the middle stage (exercise arithmetic processing section 211) and the function is thereby checked.

A dummy value of the same dimension as the air intake quantity value Qa measured by the MAFS 1204 is inputted as an exercise to the exercise calculating section 1207 for the basic fuel injection quantity, a dummy basic fuel injection quantity TEST TP is calculated on the basis of that input value, and the actual load value Actual KIJUN TP is calculated by correcting it with the dummy value TESTKMR of the same dimension as the air/fuel ratio sensor and correction coefficients COEF1 and ALPHA1. Further, TEST KIJUN TRQ resulting from conversion into a torque value by the torque converting means 1301 is transmitted as the solution to the exercise setting/evaluating section 301.

In this case, too, when the CPU state is in the stoichiometric mode, a value in the vicinity of the air/fuel ratio A/F=REALKMR=14.7 detected by the air/fuel ratio sensor 518 is used for load value calculation. At the same time, in the stoichiometric mode, exercise calculation is also performed by the exercise arithmetic processing section 211 with TESTKMR=14.7, which is close to the actual operating state, and the solution is thereby calculated.

However, when the CPU state is in the homogeneous lean mode, a value in the vicinity of the air/fuel ratio A/F= REALKlMlR=20 to 23 detected by the air/fuel ratio sensor 518 is used for load value calculation. Also, in the homogeneous lean mode, exercise calculation is performed by the exercise arithmetic processing section 211 with TESTKMR=22, which is close to the actual operating state, and the solution is thereby calculated.

Also, when the CPU state is in the stratified lean mode, a value in the vicinity of the air/fuel ratio A/F=REALKMR= 36 to 44 detected by the air/fuel ratio sensor 518 is used for load value calculation. At the same time, in the stratified lean mode, exercise calculation is also performed by the exercise arithmetic processing section 211 with TESTKMR-=40, which is close to the actual operating state, and the solution is thereby calculated.

In this way, the device according to the present invention can dependably execute diagnosis of the CPU 601 irrespective of the state of the CPU 601. If, in a diagnosis of the CPU 601 as described, the CPU 601 is diagnosed not to be normal, a command can be issued to prohibit its operation in the combustion mode in which it has been diagnosed not to be normal and to operate the engine in some other combustion mode.

Figure 17:
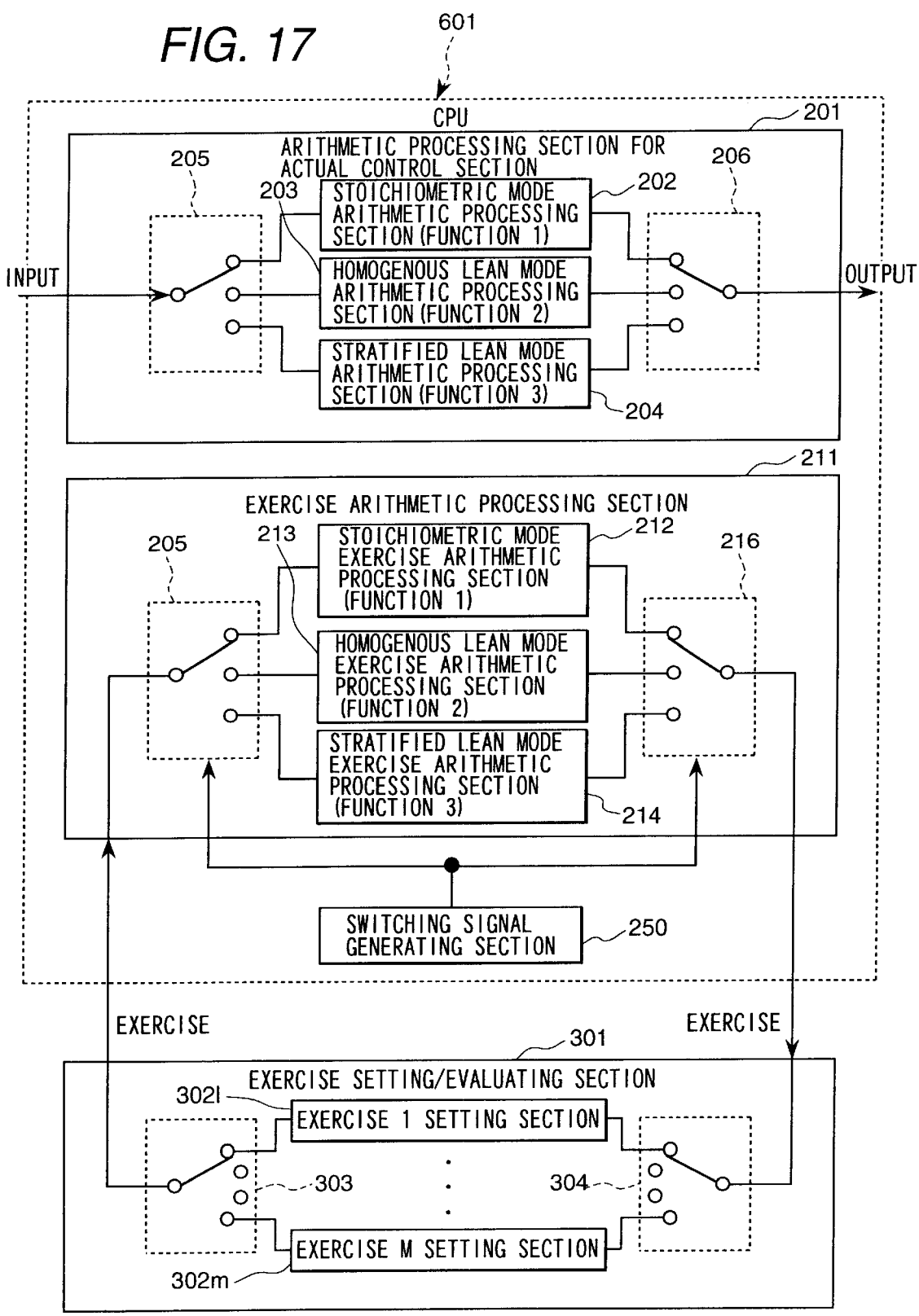
FIG. 17 is a block diagram illustrating a CPU diagnosing device in yet another embodiment of the present invention.

FIG. 17 illustrates a CPU diagnosing device in yet another embodiment of the present invention. In this mode of implementation, the switching actions of the function selecting section 215 and the solution selecting section 216 are not dependent upon the arithmetic processing state (combustion mode) of the CPU 601, but are accomplished with switching signals generated by a cyclic switching signal generating section 250. This causes the exercise arithmetic processing sections 212, 213 and 214 corresponding to different combustion modes to be cyclically selected in succession, and the selected exercise arithmetic processing section receives an exercise from the exercise setting/evaluating section 301 and calculates the exercise.

In this case, although exercise calculation by a function for another state than the current state of the CPU 601 is also performed, the same effect as in the previously described mode of implementation can be achieved by adopting the solution from the exercise calculation by the function matching the current state.

Hence, the present invention provides a CPU diagnosing device and method comprising an arithmetic processing section provided with a plurality of processing states, a exercise setting section for setting exercises and a exercise processing section which is programmed to match the plurality of processing states wherein the exercise processing section provides solutions to the exercises for diagnosing the CPU based on the matched processing states.

As can be understood from the foregoing description, a CPU diagnosing device according to the present invention can dependably diagnose a CPU as it performs exercise calculation by a function equivalent to the currently used function irrespective of the state of the CPU.

Moreover, the CPU of an engine control device to which the CPU diagnosing device according to the invention is applied can perform CPU diagnosis using functions each matching one or another of three modes of combustion state (the stoichiometric mode, the homogeneous lean mode and the stratified lean mode).

Although the invention has been described above in connection with exemplary embodiments, it is apparent that many modifications and substitutions can be made without departing from the spirit or scope of the invention. For instance, "engine control device" in the above-described modes of implementation may be read "brake control device" and further "engine torque estimation" in the above-described modes of implementation may be read "brake torque estimation," in which case, any trouble with the CPU can be dependably identified utilizing the present invention. In this case, the CPU to be diagnosed is the CPU for a control device for controlling the torque and speed of wheels, and exercise calculation can be done on exercises using the wheel speed, acceleration, drive torque or brake torque or a combination of these plurality of parameters. Accordingly, the invention is not to be considered as limited by the foregoing description, but is only limited by the scope of the appended claims.

What is claimed as new and desired to be protected by Letters Patent of the United States is:

1. A CPU diagnosing device comprising:
    an arithmetic processing section provided with a plurality of processing states and a exercise setting section for setting exercises and a exercise processing section, wherein said exercise processing section provides solutions to said exercises for diagnosing said CPU based upon a current state of said plurality of processing states.

2. A CPU diagnosing device comprising:
    an arithmetic processing section provided with a plurality of processing states;
    an exercise setting section for setting exercises;
    an exercise processing section, said exercise processing section being programmed to match a current state of said processing states; and
    wherein said exercise processing section provides solutions to said exercises for diagnosing said CPU based upon said current state.

3. The device of claim 2 wherein said exercise processing section utilizes a plurality of types of exercises in calculating said exercises.

4. The device of claim 2 wherein said exercise processing section utilizes a random number in calculating said exercises.

5. The device of claim 4 wherein said random number is provided by a counter of said CPU.

6. The device of claim 2 wherein said exercise setting section is provided outside said CPU.

7. The device of claim 2 wherein said CPU to be diagnosed is an engine control CPU.

8. The device of claim 2 wherein said plurality of processing states are a plurality of combustion modes.

9. The device of claim 8 wherein said combustion mode further comprises a stoichiometric mode and a lean mode.

10. The device of claim 8 wherein said combustion mode further comprises a stoiciometric mode, homogeneous lean mode and a stratified lean mode.

11. The device of claim 2 wherein said exercise processing section prohibits operation in the processing state if said solution is wrong.

12. The device of claim 2 wherein said CPU is selected from a group comprising a torque control, speed control or brake control CPU.

13. A CPU diagnosing device comprising:
    an arithmetic processing section provided with a plurality of processing states;
    an exercise setting section for setting exercises;
    a switching signal generation section for cyclically selecting one of said processing states; and
    an exercise processing section being programmed to provide a solution to said exercises based on said cyclically selected processing state for diagnosing said CPU.

14. The device of claim 13 wherein said exercise processing section utilizes a plurality of types of exercises in calculating said exercises.

15. The device of claim 13 wherein said exercise processing section utilizes a random number in calculating said exercises.

16. The device of claim 15 wherein said random number is provided by a counter of said CPU.

17. The device of claim 13 wherein said exercise setting section is provided outside said CPU.

18. The device of claim 13 wherein said CPU to be diagnosed is an engine control CPU.

19. The device of claim 13 wherein said plurality of processing states are a plurality of combustion modes.

20. The device of claim 19 wherein said combustion mode further comprises a stoichiometric mode and a lean mode.

21. The device of claim 19 wherein said combustion mode further comprises a stoiciometric mode, homogeneous lean mode and a stratified lean mode.

22. The device of claim 13 wherein said exercise processing section prohibits operation in the processing state if said solution is wrong.

23. The device of claim 13 wherein said CPU is selected from a group comprising a torque control, speed control or brake control CPU.

24. A method of diagnosing a CPU comprising the steps of:
    providing an arithmetic processing section with a plurality of processing states;
    setting exercises with an exercise setting section;
    programming an exercise processing section to match a current state of said processing states; and
    wherein said exercise processing section provides solutions to said exercises for diagnosing said CPU based on said current state.

25. The method of claim 24 wherein said exercise processing section utilizes a plurality of types of exercises in calculating said exercises.

26. The method of claim 24 wherein said exercise processing section utilizes a random number in calculating said exercises.

27. The method of claim 24 wherein said random number is provided by a counter of said CPU.

28. The method of claim 24 wherein said exercise setting section is provided outside said CPU.

29. The method of claim 24 wherein said CPU to be diagnosed is an engine control CPU.

30. The method of claim 24 wherein said plurality of processing states are a plurality of combustion modes.

31. The method of claim 30 wherein said combustion mode further comprises a stoichiometric mode and a lean mode.

32. The method of claim 30 wherein said combustion mode further comprises a stoiciometric mode, homogeneous lean mode and a stratified lean mode.

33. The method of claim 24 wherein said exercise processing section prohibits operation in the processing state if said solution is wrong.

34. The method of claim 24 wherein said CPU is selected from a group comprising a torque control, speed control or brake control CPU.

35. A method of diagnosing a CPU comprising the steps of:
providing an arithmetic processing section with a plurality of processing states;
setting exercises with an exercise setting section;
cyclically selecting one of said processing states with a switching signal section; and
programing an exercise processing section to provide solutions to said exercises for diagnosing said CPU based on said cyclically selected processing state.

36. The method of claim 35 wherein said exercise processing section utilizes a plurality of types of exercises in calculating said exercises.

37. The method of claim 35 wherein said exercise processing section utilizes a random number in calculating said exercises.

38. The method of claim 35 wherein said random number is provided by a counter of said CPU.

39. The method of claim 35 wherein said exercise setting section is provided outside said CPU.

40. The method of claim 35 wherein said CPU to be diagnosed is an engine control CPU.

41. The method of claim 35 wherein said plurality of processing states are a plurality of combustion modes.

42. The method of claim 41 wherein said combustion mode further comprises a stoichiometric mode and a lean mode.

43. The method of claim 41 wherein said combustion mode further comprises a stoiciometric mode, homogeneous lean mode and a stratified lean mode.

44. The method of claim 35 wherein said exercise processing section prohibits operation in the processing state if said solution is wrong.

45. The method of claim 35 wherein said CPU is selected from a group comprising a torque control, speed control or brake control CPU.

* * * * *